Figure 6:
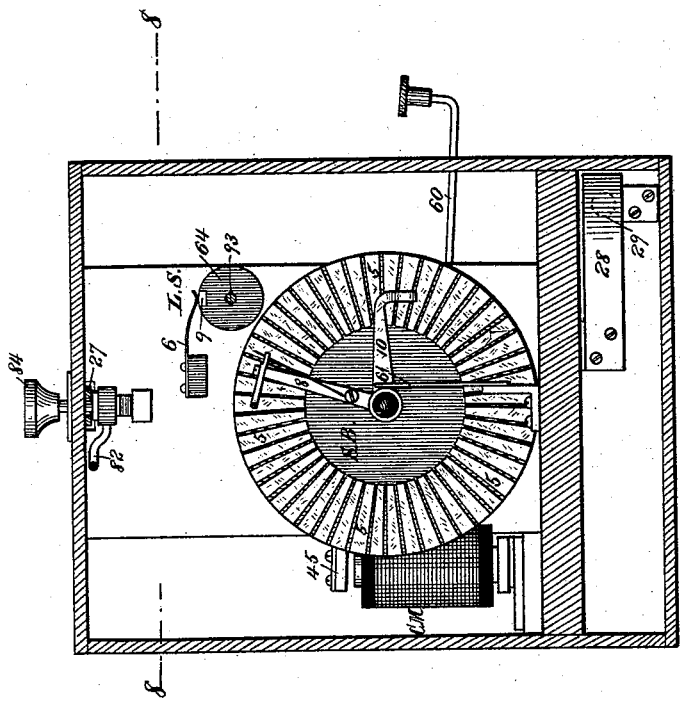

(No Model.) 6 Sheets—Sheet 1.
W. TRAFFORD.
ELECTRIC SIGNALING APPARATUS.
No. 492,545. Patented Feb. 28, 1893.
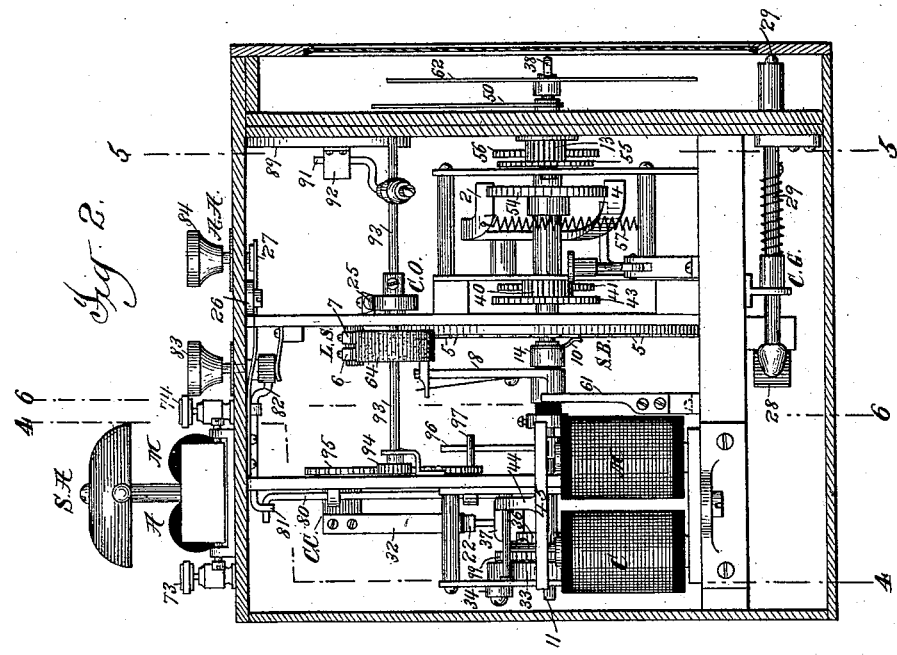
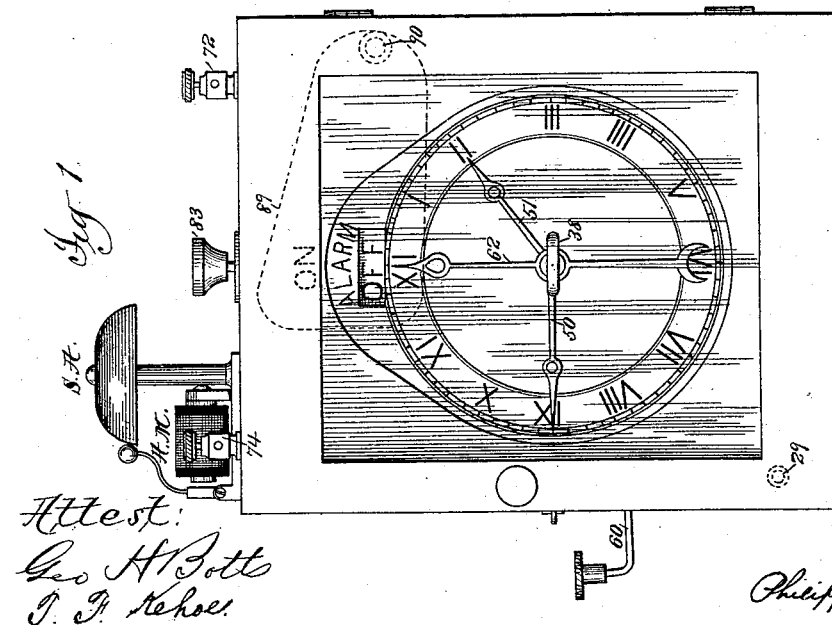
Attest:
Geo. H. Botts
T. J. Kehoe.
Inventor:
Wesley Trafford
by
Philipp Numan Phelps
Attys
THE NORRIS PETERS CO., PHOTO-LITHO., WASHINGTON, D. C.

(No Model.) 6 Sheets—Sheet 2.
W. TRAFFORD.
ELECTRIC SIGNALING APPARATUS.
No. 492,545. Patented Feb. 28, 1893.
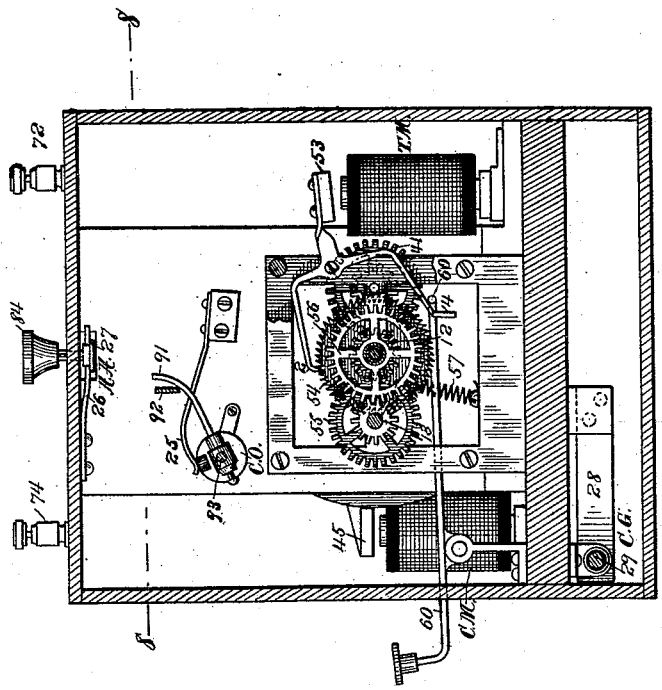
Attest:
Geo. H. Bott
J. F. Kehoe
Inventor:
Wesley Trafford
by
Philipp & Brunson Phelps
Attys.

(No Model.) 6 Sheets—Sheet 3.
W. TRAFFORD.
ELECTRIC SIGNALING APPARATUS.

No. 492,545. Patented Feb. 28, 1893.

Attest:
Geo H Bott
J. F. Kehoe

Inventor:
Wesley Trafford
by
Philipp Munson Phelps
Attys (No Model.) 6 Sheets—Sheet 4.
W. TRAFFORD.
ELECTRIC SIGNALING APPARATUS.
No. 492,545. Patented Feb. 28, 1893.
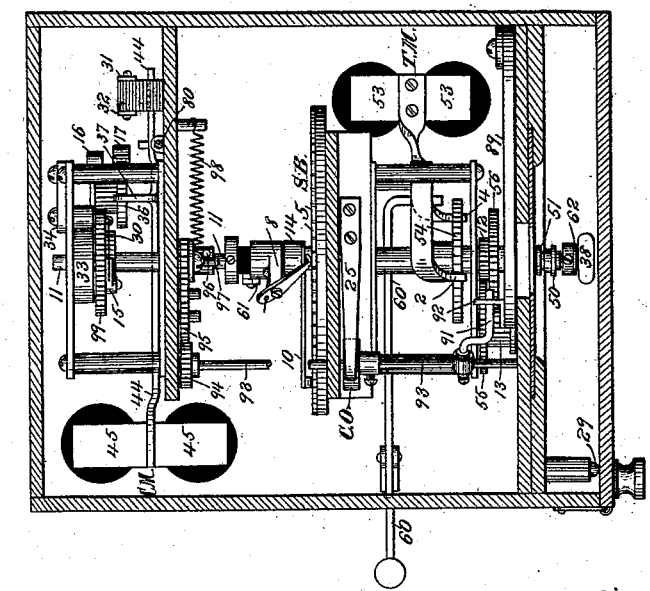
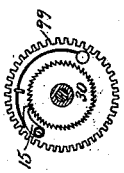
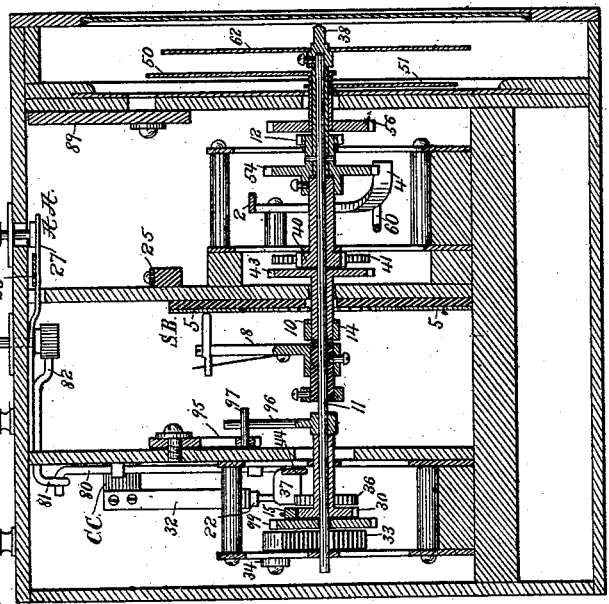
Attest:
Geo H Botts.
J. F. Kehoe.
Inventor:
Wesley Trafford
by
Philipp Mumm & Phelps
Atty's (No Model.) 6 Sheets—Sheet 5.

W. TRAFFORD.
ELECTRIC SIGNALING APPARATUS.

No. 492,545. Patented Feb. 28, 1893.

(No Model.)  6 Sheets—Sheet 6.
W. TRAFFORD.
ELECTRIC SIGNALING APPARATUS.
No. 492,545.  Patented Feb. 28, 1893.
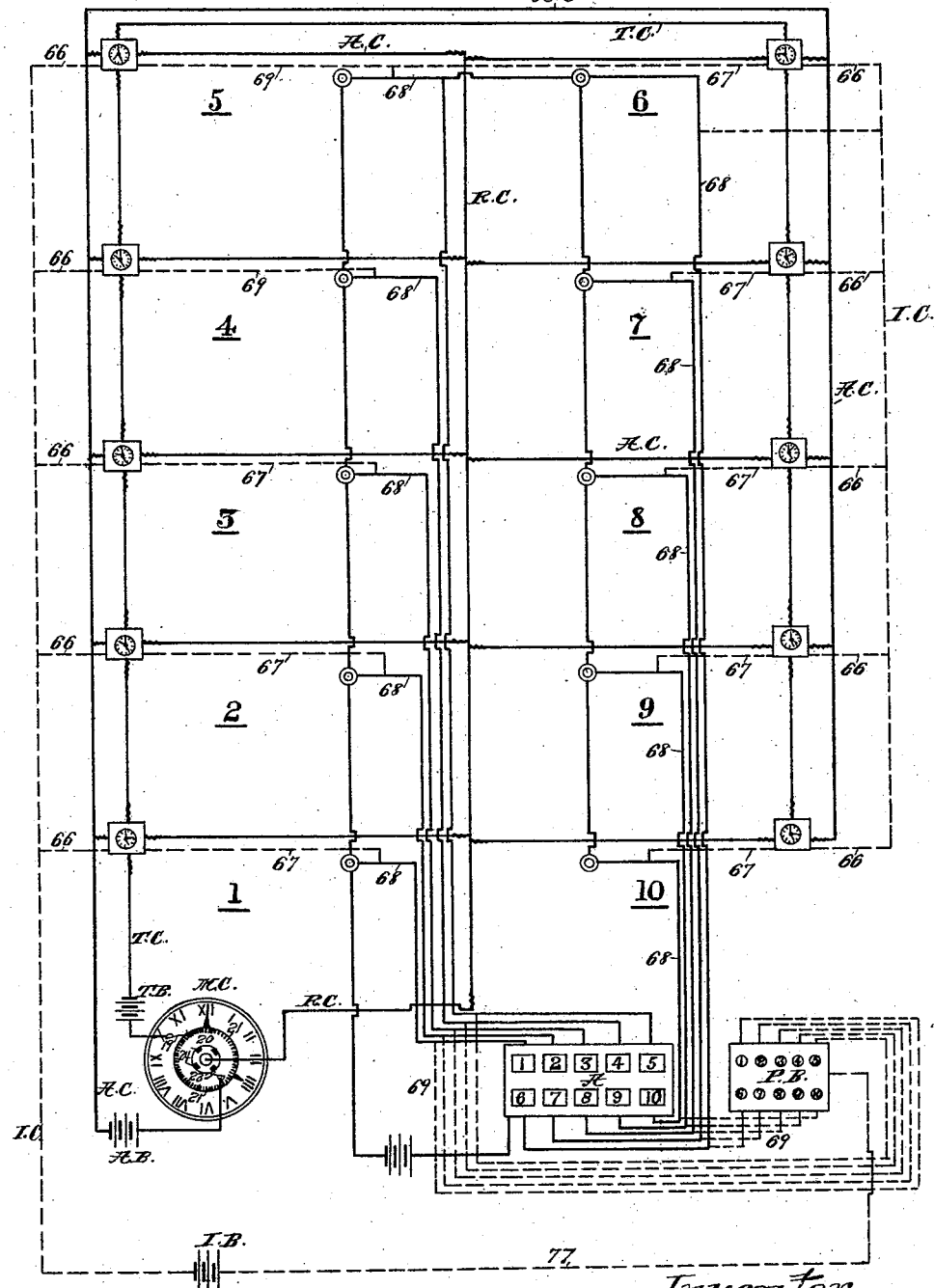

UNITED STATES PATENT OFFICE.

WESLEY TRAFFORD, OF NEW YORK, N. Y.

ELECTRIC SIGNALING APPARATUS.

SPECIFICATION forming part of Letters Patent No. 492,545, dated February 28, 1893.

Application filed October 17, 1891. Serial No. 408,982. (No model.)

*To all whom it may concern:*

Be it known that I, WESLEY TRAFFORD, a citizen of the United States, residing at New York, county of New York, and State of New York, have invented certain new and useful Improvements in Multiplex Electric Signaling Apparatus, fully described and represented in the following specification and the accompanying drawings, forming a part of the same.

This invention relates to that class of apparatus which is employed in producing signals in the various rooms or apartments in such large establishments as hotels, flats, factories, and the like, and more particularly to that species of apparatus wherein the signal is conveyed to the several rooms from a central station or main office, by means of an electric circuit.

The invention embraces a multiplex signaling apparatus consisting of sub-station alarm apparatuses contained in separate rooms, the action of which is governed from a central station or main office by means of an electric circuit controlled by a clock, both as to time and duration of alarm.

It also embraces a signaling apparatus the alarm bell of which is operated by an electric current controlled by a switch board and switch arms operated by the time mechanisms and an alarm indicator.

It also includes a signaling system comprising a central station clock, a single main line electric circuit and a sub-station alarm apparatus the circuit through which is controlled by said clock.

It further comprises a cut out device whereby the main electric circuit current is rendered ineffective in each sub-station signal apparatus when its alarm indicating pointer is at the neutral or unit point. And the invention also includes many features and combinations so fully hereinafter pointed out and claimed as to need no preliminary description.

Figure 5:
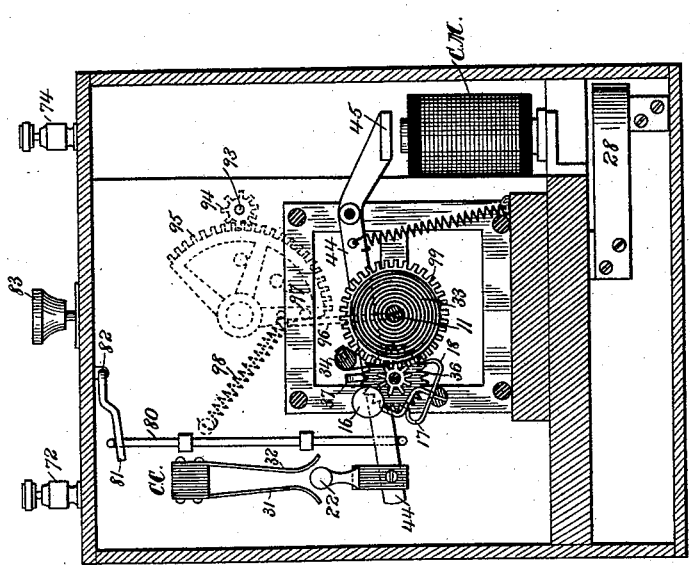
Figure 10:
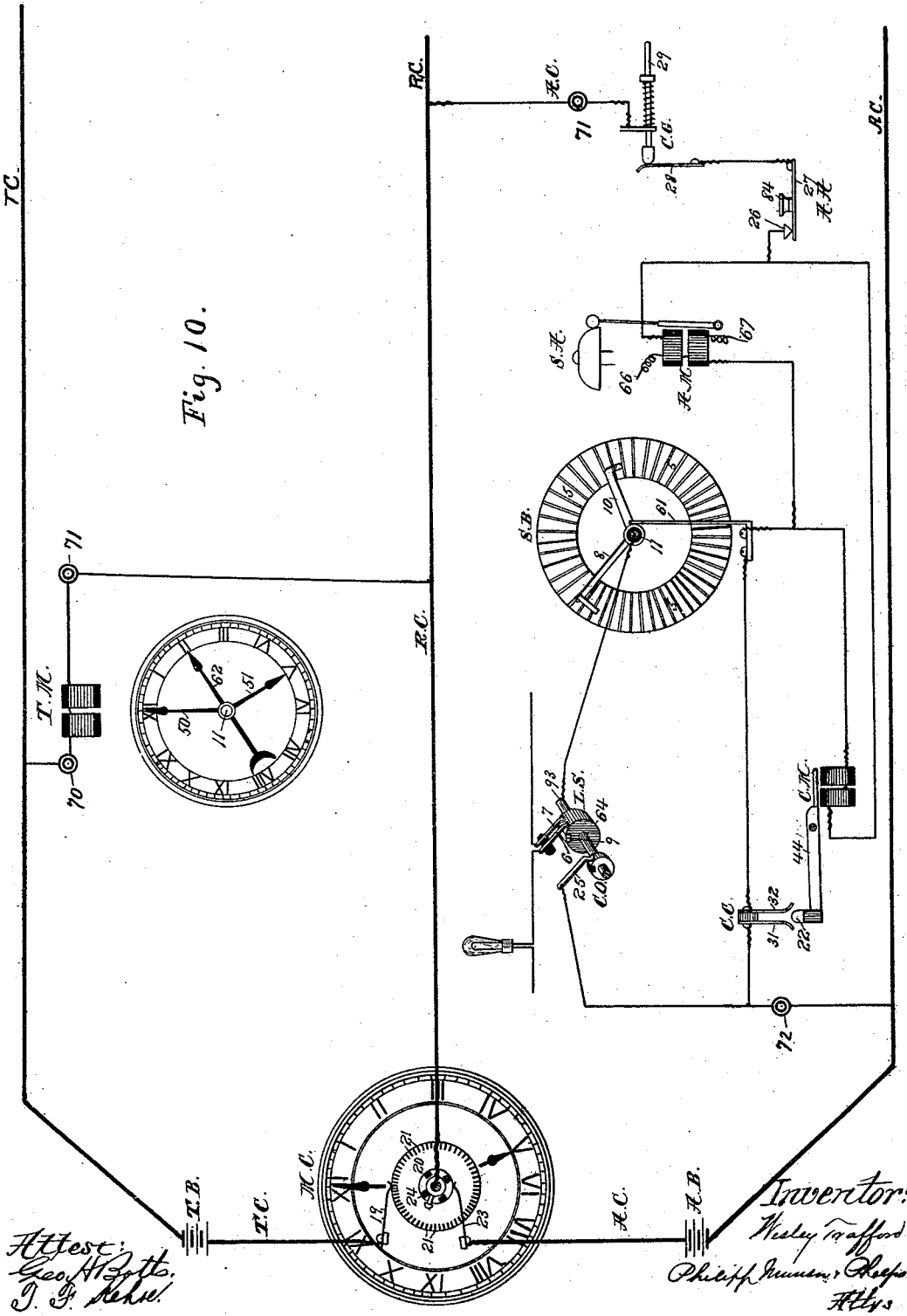

Figure 1 is a front elevation. Fig. 2 a left hand side elevation. Fig. 3 a right hand side elevation. Fig. 4 a vertical sectional elevation looking rearward on line 4—4 of Figs. 2 and 3. Fig. 5 a vertical sectional elevation, on line 5—5 of Figs. 2 and 3 looking from the rear. Fig. 6 a vertical sectional elevation, looking forward on line 6—6 of Figs. 2 and 3. Fig. 7 a central vertical section as seen from left hand side. Fig. 8 a horizontal sectional elevation on line 8—8 of Figs. 4 and 6. Fig. 9 is a detail. Fig. 10 is a diagrammatic illustration of a single system. Fig. 11 is a diagrammatic illustration of the multiplex system and an extension of it.

First considering the signaling apparatus as a time indicator, it will be understood that in the substation apparatus the minute hand 50 and hour hand 51 may be caused to move over the clock dial to indicate time by any of the well-known means in use whereby the movements of the corresponding hands of a central station clock are accomplished by electric impulses transmitted at regular intervals to actuating devices connected with the signaling apparatus at the various substations. The devices here made use of will first be explained, see Figs. 2, 3, 8 and 10.

The electrical impulses are governed by the rotary switch 20, that is fast upon the shaft of the minute hand of the central station clock, to which shaft the return circuit line wire R C is attached. This switch contains as many conducting and non-conducting points as may be desired according as the electric impulses are to be made each minute, half or other divisional part of a minute. When the spring contact arm 19 rests upon the conducting surface, as 21, the time circuit line wire T C attached to said arm 19 is connected with the time battery T B, and the time circuit line wire becomes charged and thus energizes the time magnet T M. When this magnet is thus energized it causes the armature 53 to be drawn down and when the current ceases, as the contact arm 19 passes onto a non-conducting surface, the armature 53 will be moved away from the magnet by means of the spring 57. These electric impulses operate an escapement which is a common construction. It consists of an escape wheel 54 in the teeth of which play the pallets 2, 4, that are carried by levers attached to the armature 53. One of the levers is attached by the spring 57 to the base plate so as to normally hold the pallets in the position of Fig. 4. The escape wheel 54 (see Fig. 7) is pinned fast upon an elongated sleeve that carries the minute hand 50 and turns directly on the shaft 11 that extends through the apparatus. This sleeve also carries a pinion 12 gearing with a going train consisting of a wheel 55 whose shaft has a pinion 13 gearing with a wheel 56 that is fast on a sleeve that carries the hour hand 51 and turns freely upon the sleeve of the minute hand 50.

Whenever the electric circuit passing through the time circuit line wire T C is made and broken by the governor or rotary switch 20, the time magnet T M is quickly magnetized and demagnetized, thus causing, assisted by the spring 57, the armature 53 and the pallets 2, 4, to perform a vibration and the escape wheel to move one tooth, which will move the minute hand a distance say equal to that marking a minute on the clock dial, and also, through the going train, cause a corresponding fractional movement of the hour hand. These electric impulses and mechanical movements repeated at regular intervals governed by the main station clock, will thus indicate corresponding time upon the dials of all the signaling apparatus in the various rooms.

In order to synchronize the various apparatus each is provided with an adjusting lever 60 with thumb piece extending at one side, by which the armature 53 and the arms and pallets 2, 4, it carries may be vibrated at will, to move the pointers to any desired time indicating positions. In order to use the time indicated by the clock dial and pointers of the sub-apparatuses as a means controlling the electric current that operates the alarm of said apparatus, a stationary circular switch board S B is provided and for co-operation with it, a rotating switch arm 8, that has movements of rotative adjustment corresponding with those of the alarm pointer 62, and a switch arm 10 that has the same rotative movements as the hour hand. This switch-board (see Fig. 6) is an insulated holder that is provided with a series of radiating segmental metal contact plates 5, 5, 5 &c., corresponding in number and position with the full or half hour indicating points on the dial, or it may be quarter hours or even smaller divisions of the hour, although in the apparatus illustrated it is quarter hours. The rotating switch arm 8 (see Fig. 7) that is moved by the alarm pointer and co-operates with the switch board is insulated upon and turns with the horizontal shaft 11, said arm 8 being provided with an electric conductor consisting of a spring arm 61 bearing upon its hub and fixed to and insulated upon the base plate, and connected with one coil of the circuit magnet C M. This switch arm 8 is fast to but insulated upon the shaft 11 which carries an alarm pointer 62 that may be turned to indicate any desired hour or quarter hour for alarm purposes, and consequently when the pointer 62 is adjusted by means of the thumb piece 38, its switch arm 8 will be set upon a segment plate 5 of the switch board corresponding to a given quarter hour or other division of time indicated by the pointer 62. The switch arm 10 makes connected movements with the hour hand by means of a driving train consisting of a pinion 40 on a sleeve that is secured to the sleeve carrying the hour hand, which pinion gears with a wheel 41 on whose shaft is a pinion (see Fig. 4) gearing with a wheel 43 fast on the hub 14 that carries said switch arm 10.

As the electric pulsations operate through the time magnet T M to cause the hour hand to make a divisional time movement corresponding to that of the minute hand it follows that when the moving hour hand 51 has arrived at a point indicating the same time on the clock dial, as does the alarm pointer the switch arm 8 will have been brought into contact with the same segment plate 5 upon which the switch arm 10 has been set and then close the circuit between the arms 8 and 10, so that an electric current may pass through them, and the segment plate 5 of the switch-board. Connected with this shaft 11 is an indicator to show when the main current is "on" or "off." It consists of a plate 89 bearing said words and swinging on a pivot 90, said plate dropping by gravity and being upheld so as to expose "off" when the alarm pointer is at XLI, by a tappet 91, bearing on arm 92, and raised or lowered by a vibrating shaft 93 that is permitted to turn in one direction by the forward movement of the alarm pointer 62 and moved in the other direction by a pinion 94 and a segment 95 through a pin 97 on said segment, which pin engages a tappet 96 projecting from the spring impelled shaft 11.

When the alarm pointer 62 is turned forward it swings the tappets 96 away from the pin 97 and allows the segment 95 which meshes with a pinion 94, to be drawn back by the spring 98 and thus to move the shaft 93, which rocks the tappet 91 and drops the indicator plate 89. The switch arm 8 being attached to the shaft 11 is simultaneously moved to the desired point of indicated time, where it is maintained by a ratchet wheel 30 (see Fig. 7) that is secured to the sleeve that is fixed on said shaft and carries the tappet 96, and coupled to a wheel 99 loose on the shaft 11 by means of a pawl 15 carried by said wheel 99. This shaft 11 has one end of a coiled spring 33 attached to it and the outer end of the spring is connected to the post 34, and consequently whenever the shaft 11 is rotated by a forward movement of the alarm pointer, the spring 33 is wound up and power enough stored to turn the shaft in the opposite direction.

A detent for the spring impelled shaft 11 consists of a stop wheel 36 that is geared with the wheel 99, by a pinion, in the teeth of which stop wheel normally rests a dog 37 that is carried by the trip arm or lever 44 extending from the armature 45 of the circuit magnet C M. This dog 37 is raised to release the shaft 11 whenever the magnet C M is energized to attract the armature 45, and thereupon the spring 33 causes said shaft 11 to rotate and carry the tappet 96 into contact with the pin 97 to rock the shaft 93 and thus raise the indicator plate 89 so as to expose "off" through the dial; carry the alarm pointer to its normal position of "XII," and the switch arm 8 to a point corresponding with that of said alarm pointer. In order that these return movements shall be uniform, a regulating device consisting of a weighted vibrating escapement is provided. It consists of a short shaft carrying a weight 16 and having two arms 17, 18 engaging the teeth of the stop wheel 36 whereby the said weight is vibrated to produce a regular motion.

The outer end of the lever 44 extending from the armature 45 is provided with an insulated metal contact head 22 that operates a circuit closer C C. This contact head 22 is preferably a wheel which when raised acts to press apart and thus connect two spring arms 31 32 through which a circuit is thus established. This circuit closer may be operated independently by means of a hooked rod 80 engaging the lever 44 and operated by a rock arm 81 extending from a shaft rocked by another arm 82 and a spring seated rod pressed to duty by a button 83, whenever it is desired to run down the alarm devices in order to reset them. This constitutes a let off mechanism and might consist of an arm extending rearwardly from the circuit magnet through the case. There are two circuits connecting with the main station, viz:—a time circuit and an alarm circuit. The time circuit is a single line wire T C extending from the rotary switch 20 of the central station clock, passing through a battery T B and thence throughout the building, the said single line wire being connected by short wires to the binding posts 70 of each of the many station indicators, the return being made by a single wire R C to the shaft carrying said rotary switch to which return wire each station indicator is connected by a short wire from its binding post 71. The main line alarm circuit is a single wire or conductor A, C (see Fig. 11) extending from a rotating governor switch 24 operated by the central station clock, which wire or conductor A, C is connected with the alarm circuit battery A, B, and runs near each of the sub station apparatuses with each of which it is connected by means of a short wire attached to a binding post 72 of each sub station apparatus. The return circuit is similarly made through a main line return circuit wire R, C with which each sub station apparatus is connected by a short wire from its binding post 71. This main line return circuit wire or conductor R, C is also utilized to complete the time circuit.

The alarm bell S A may be placed anywhere in the room and be operated by a current passing through the binding posts 73, 74, to its magnet A M.

The operation will be well understood by a consideration of the diagrams Figs. 10 and 11 which represent the connections of the main or central station clock with the auxiliary or substation signaling devices. In this diagram the main or central station clock is marked M C, the main time and alarm circuit wires are marked respectively T C and A C and their batteries T B and A B, while the common return wire for completing both the time and alarm circuits is marked R C. The time circuit wire T C is connected with a spring contact arm 19 that bears upon a rotating switch wheel 20 fast on the shaft of the minute hand of the clock, and the return wire R C is connected with said shaft. The switch 20 has a number of insulated points which provide between them conducting points to the number required, sixty if the electric impulses are to be made each minute. As the main station clock operates to mark time and by means of the rotary switch 20, at regular intervals to send electric impulses from the battery T B through the line wire T C, the magnet T M will be energized to operate the escapements of the clock part of each substation signaling device and produce step like rotary movements of the clock pointers. The alarm circuit wire A C is connected with a spring contact arm 23 that bears upon a rotating governor switch 24 fast on the shaft of the minute hand of the main station clock, to which shaft the common return circuit wire is connected as we have seen. This switch has four or more insulated portions, four if the alarm is to be made on the quarter hours and so forth; and hence, if properly adjusted, this governor switch will so operate as to establish and maintain the electric alarm circuit for alarm purposes and yet suspend or break said circuit after the alarm has continued any given time, say 10 seconds. The alarm circuit main wire A C has one branch running to the spring contact arm 25 of the cut out C O, and continuing from its shaft to the shaft 11 of the substation clock through which latter shaft it communicates with the switch arm 10 that is moved by the sleeve of the hour hand. The other branch of this wire A C runs to one spring arm of the circuit closer C C continues from the other arm to the spring arm 61 which bears upon the hub of the switch arm 8. From this spring arm 61 this branch of the line wire is again divided its branches running to one of the coils of the circuit magnet C M and to one of the coils of the signal bell magnet A M; the other coils of these two magnets being connected by what may be termed a continuation of this wire which again branches to connect with a contact head 26 of an alarm arrester A A the spring member 27 of which is in turn connected with the plate member 28 of a current governor C G the sliding spring rod member 29 of which is connected with the return circuit wire R C. The door of a substation clock having been opened for the purpose of setting the alarm, the sliding rod 29 of the current governor C G will move outward and break the line thus preventing any ringing of the alarm signal bell during the setting operation if the line happens to be charged by suitable contact of the arm 25 of the cut out C O. The alarm pointer is now turned to indicate the time when an alarm is desired thus carring the switch arm 8 onto the appropriate plate 5 of the switch board S B and will turn the cut out switch C O so as to establish the circuit through it and its contact arm 25. Upon closing the clock door the circuit will be re-established through the current governor C G. Concertedly with the onward movements of the hour hand of each sub-station apparatus the switch arm 10 will be moved over the switch board S B, and when the switch arm reaches the segment plate 5 upon which the switch arm 8 has been set by the appropriate movement of the alarm pointer 62, a current from the line wire will be established through the said arm and plates. This will instantly energize the signal bell magnet A M and the circuit closer magnet C M the former causing the signal bell S A to ring and the latter will cause the lever 44 to move its contact head 22 between and into contact with the arms 31, 32 of the circuit closer C C to establish the circuit through them and consequently directly to the signal bell. The movement of the lever 44 to operate the circuit closer C C simultaneously raises the dog 37 to trip the stop wheel 36 and release the coiled spring 33 which, through the shaft 11 immediately rotates the switch arm 8 out of contact with the switch board plate 5, thus breaking the circuit through the switch board which is however established at that moment through the circuit closer C C. As the shaft 11 rotates to restore the parts it carries to their normal positions, it finally turns the shaft 93 to a position that brings the non-conductive portion of the cut out C O, into contact with the spring contact arm 25 and cuts off the circuit through the shaft 11. It will now be apparent that when the alarm pointer 62 is brought to its neutral or unit point which for convenience is made "XII" on the clock face, the arm 25 of the cut out will rest upon its non-conductive portion and thus prevent the completion of the circuit until the said pointer is timed enough to move the arm 25 onto the conductive portion of said cut out. With this provision it matters not how frequently the rotary switch 20 permits a current to pass through the line wire, since only such sub-station signaling apparatus will be operated as have the alarm pointers moved off from the neutral point. The alarm arrester A A is a simple circuit breaker that may be hand operated at any moment to break the circuit and thus terminate the ringing of the signal, without regard to the suspension caused by the governor 24 or the cut off C O. The shaft 93 also carries a rotary switch L S preferable consisting of a wheel 64 made of non-conducting material and having a conducting strip 9 in its face, which may be carried into contact with the two spring arms 6, 7, connected with an electric light line, and thus enable the electric lamps to be made luminous simultaneously with the ringing of the alarm bell.

As these improvements thus far described are especially designed to be used in buildings wherein each room will be additionally provided with an annunciator system, I have provided each signal bell of the substation alarm signal apparatuses with circuits independent of the time operated means for producing the signals. This is illustrated in Fig. 11. The alarm bell of each signal apparatus is connected with an independent battery I B, by an independent circuit wire I C, connected with one pole of the magnet of each of the series of substation signal apparatuses by short wires 66, and the opposite pole of these magnets is connected by short wires 67 to the room line wire 68 communicating with the central office annunciator A. At the central office each of these annunciator wires is connected with one of a series of switch buttons by short wires 69 and the series of pushing switch buttons P B is connected *en masse* by a wire 77 with the said battery I B. It therefore follows that upon pressing one of these pushing switch buttons P B, a circuit will be completed through the alarm bell magnet of the corresponding room signal apparatus and that signals may thus be made in each room independent of the time operating mechanism.

With this time operated multiplex signal apparatus coupled with the utilization of the annunciator wires and one extra battery and set of pushing switch buttons, not only time, but independent signals, may be made in the various rooms of a building.

As is apparent the sub-signaling apparatuses may, if so desired, in some uses of their particular construction be operated from a constant battery and the time of their operation be controlled wholly by the setting of their alarm pointer and movements of their time indicating hands propelled either by a central station clock, or by a clock mechanism attached to each apparatus; but in such an arrangement it is obvious that the alarm will continue until the battery is exhausted unless the alarm arrester A A is operated to break the circuit by pressing the button 84, which in the absence of an occupant in the room in which the sub-station is located could not be done, and hence the battery A B would be run down or exhausted. In a multiplex system, such as is herein set forth, the use of the governor switch 24 is therefore essential to a perfect operation of the various sub-signaling apparatuses, one or more of which may be set into operation any time and to the preservation of the battery operating them.

What is claimed is—

1. A multiplex signaling apparatus consisting of sub-station alarm apparatuses, the time indicators whereof are moved by electric impulses controlled by a rotating switch operated by a central clock, and the alarm devices whereof are actuated by an electric current through a single main line wire the time of the passage of which current through said main line wire is controlled by a governor switch that is rotated by said clock, substantially as described.

2. A multiplex signaling apparatus consisting of sub-station alarm apparatuses, the time indicators whereof are moved by electric impulses controlled by a rotating switch operated by a central clock, and the alarm devices whereof are actuated by an electric current, through a single main line wire the duration of which current in the main line wire is controlled by a governor switch that is rotated by said clock, substantially as described.

3. A multiplex signaling apparatus consisting of sub-station alarm apparatuses, the time indicators whereof are moved by electric impulses controlled by a rotating switch operated by a central clock, and the alarm devices whereof are actuated by an electric current through a single main line wire, the passage of which current through each sub-station apparatus to produce the alarm is determined by a switch board, a switch arm set thereon at a point indicating the desired time of alarm, and a switch arm brought to a coinciding position thereon by the movement of the hour hand, substantially as described.

4. A signaling apparatus the alarm of which is operated by an electric current, the passage of which current is controlled by a switch board having a multiplicity of contact plates corresponding to the time positions at which an alarm may be made, a switch arm co-operating therewith and capable of being set in contact with the plate that is in a position indicating the desired time of alarm, and a rotating switch arm that is brought into contact with said plate by the turning of the hour hand of the clock, substantially as described.

5. The combination with a main line alarm circuit wire or conductor A, C, its battery A, B, and an alarm bell S. A. and its operating magnet A, M connected with said main line alarm circuit, of an auxiliary-circuit magnet C, M, and circuit closer C, C operated thereby, and a circuit controlling switch device operated by the movements of the time indicating hand, substantially as described.

6. The combination with the switch board having a multiplicity of contact plates corresponding with the time positions at which an alarm contact may be made, and a switch arm adjustable thereon by the alarm pointer shaft, in a position corresponding with the desired time of alarm, of a switch arm moved over the switch board by the hour hand, whereby an alarm operating electric circuit is established, substantially as described.

7. The combination with a main line alarm circuit wire or conductor A, C, and an alarm bell S, A and its operating magnet A, M connected therewith, of the switchboard having a multiplicity of contact plates corresponding with the time positions at which an alarm contact may be made, a switch arm moved to a fixed position by turning the alarm pointer shaft, a co-operating switch arm rotatively carried over the switchboard by the step by step movements of the hour hand, of an auxiliary-circuit magnet C, M and auxiliary circuit closer C, C, substantially as described.

8. The combination with a main line alarm circuit wire or conductor and an alarm bell and its operating magnet connected therewith, a circuit controlling switch operated by the movements of the time indicating hand, an auxiliary-circuit magnet and circuit closer operated thereby, of a cut out C, O in the main line alarm circuit wire whose conducting contact is made by the rotative adjustment of the alarm pointer and automatically broken by the rotative return of the alarm pointer to its normal position, substantially as described.

9. The combination with the alarm magnet and alarm signal, of the switch board, switch arm moved by the hour hand, switch arm adjusted by the alarm pointer shaft, circuit magnet, circuit closer, cut out and rotating governor switch of the central station clock, operating to control the alarm current substantially as described.

10. The combination with the switch arm and the alarm pointer shaft by which it is adjusted, and the spring attached to said shaft, of the detent by which said switch arm and alarm pointer are arrested and released for restoration to their normal positions, substantially as described.

11. The combination with the switch board, switch arm moved thereon by the hour hand, switch arm adjusted thereon by the alarm pointer shaft and the shaft impelling spring, of the circuit magnet, circuit closer, a detent securing the adjustment of said alarm pointer shaft, and a releasing mechanism operated by the circuit magnet whereby when the alarm is started, the alarm pointer and its switch arm are restored to their normal positions, substantially as described.

12. The combination with the alarm pointer shaft and the alarm controlling switch, of an indicator 89 and intermediate connecting devices whereby the rotative movement of said shaft, which sets the switch into the operative position, is transmitted to and trips said indicator from its normal position and the reverse movement of said shaft operates through said intermediate connecting devices to return said indicater to its normal position, substantially as described.

13. The combination with a main alarm circuit wire, an alarm signal and its operating magnet, a switch controlled as to the time of its operation by means of alarm setting devices and operated by the movement of the hour hand accomplished by an independent time circuit, and a shaft 93 rocked in one direction to a fixed position by the alarm setting devices and in the other when the alarm is tripped, of an electric lamp, its independent electric circuit line and a switch therein operated by the movements of said rock shaft 93, substantially as described.

14. A signaling system, comprising a central station clock, a single main line electric alarm circuit, and a multiplicity of sub-station alarm apparatus the circuit through which is controlled by said clock, substantially as described.

15. In a signaling apparatus the combination with an alarm signal and operating electro magnet, of an adjusting switch for controlling the current for energizing said magnet and an automatically operating cut out for suspending the passage of the current when the switch is set on the neutral or unit point, substantially as described.

16. A signaling system, comprising a central station clock, a single main line electric alarm circuit and a multiplicity of sub-station alarm apparatuses each of which has short connections with the main line and a switching device operated by said clock for controlling the circuit, substantially as described.

17. The combination with a multiplicity of electric time signal apparatuses disposed in the various rooms of a building and each provided with an electric signal bell and a battery wire connected therewith, of separate circuit wires connecting each signal bell with the room wire of an annunciator, and wires connecting each of the annunciator line wires with a bank of switch buttons, whereby each signal bell may be independently rung from a central station, substantially as described.

In testimony whereof I have hereunto set my hand in the presence of two subscribing witnesses.

WESLEY TRAFFORD.

Witnesses:
J. J. KENNEDY,
GEORGE H. BOTTS.